United States Patent
Gustin

(10) Patent No.: US 6,732,674 B2
(45) Date of Patent: May 11, 2004

(54) OUTSIDE WATERING TROUGHS FOR LIVESTOCK

(75) Inventor: Jean-Pierre Gustin, Charleville-Mézières (FR)

(73) Assignee: La Buvette, Tournes (FR)

( * ) Notice: Subject to any disclaimer, the term of this patent is extended or adjusted under 35 U.S.C. 154(b) by 0 days.

(21) Appl. No.: 10/342,206

(22) Filed: Jan. 15, 2003

(65) Prior Publication Data

US 2003/0131798 A1 Jul. 17, 2003

(30) Foreign Application Priority Data

Jan. 17, 2002 (FR) .............................. 02 00533

(51) Int. Cl.⁷ ................................................ A01K 7/00
(52) U.S. Cl. ..................... 119/72; 119/74; 222/554; 222/563
(58) Field of Search .................. 119/72, 74, 57.5; 222/563, 552, 554; 4/295; 215/355, 356; 217/110

(56) References Cited

U.S. PATENT DOCUMENTS

| | | | | | |
|---|---|---|---|---|---|
| 57,382 | A | * | 8/1866 | Rogers | 222/552 |
| 130,208 | A | * | 8/1872 | Frank | 215/356 |
| 694,013 | A | * | 2/1902 | Hayes | 215/356 |
| 802,382 | A | * | 10/1905 | Fenn | 215/356 |
| 2,015,343 | A | * | 9/1935 | Jackson | 222/485 |
| 2,172,644 | A | * | 9/1939 | Smith | 222/552 |
| 2,609,955 | A | * | 9/1952 | Moore | 215/354 |
| 2,767,508 | A | * | 10/1956 | Kiember | 43/56 |
| 3,184,091 | A | * | 5/1965 | Hoffman | 217/99 |
| 4,818,029 | A | * | 4/1989 | Mourot et al. | 301/5.24 |
| 5,105,768 | A | * | 4/1992 | Johnson | 119/61 |
| 5,201,774 | A | * | 4/1993 | Greene | 623/34 |
| 5,377,621 | A | * | 1/1995 | Camm | 119/61 |
| 5,392,967 | A | * | 2/1995 | Satomi et al. | 222/509 |
| 5,437,387 | A | | 8/1995 | Burns | |
| 5,498,333 | A | * | 3/1996 | Canther | 210/198.1 |
| 5,524,160 | A | * | 6/1996 | Debeaux et al. | 385/92 |
| 5,680,954 | A | * | 10/1997 | Arnold et al. | 220/300 |
| 5,711,248 | A | * | 1/1998 | Boyd | 119/77 |
| 6,079,361 | A | * | 6/2000 | Bowell et al. | 119/72 |
| 6,142,101 | A | * | 11/2000 | Pelsor | 119/61 |
| 6,142,186 | A | * | 11/2000 | Donovan | 138/89 |
| 6,148,767 | A | * | 11/2000 | Manchess | 119/75 |
| 6,490,739 | B1 | * | 12/2002 | Lee | 4/293 |
| 2001/0054800 | A1 | * | 12/2001 | Trichard | 277/602 |

FOREIGN PATENT DOCUMENTS

| | | |
|---|---|---|
| EP | 0 753 250 A1 | 1/1997 |
| EP | 0 806 369 A1 | 11/1997 |
| FR | 911 569 | 7/1946 |

* cited by examiner

*Primary Examiner*—Yvonne Abbott
(74) *Attorney, Agent, or Firm*—Young & Thompson

(57) ABSTRACT

Watering trough for animals provided at the base of its tank with an emptying opening. The emptying opening is of large diameter (between 90 and 120 mm) and is closed by a monobloc plug in two portions, a first portion which closes the emptying opening and a second screw-threaded portion, which engages in a screw-thread disposed in the wall of a recess hollowed out in the wall of the tank; the height of the portion being equal to the depth of the recess.

20 Claims, 1 Drawing Sheet

OUTSIDE WATERING TROUGHS FOR LIVESTOCK

BACKGROUND OF THE INVENTION

The present invention relates to an improvement in outside watering troughs for livestock and more particularly for thermally insulated watering troughs which are subject to cold in winter.

DESCRIPTION OF THE RELATED ART

It is known to position in the open air or under simple canopies, watering troughs that are thermally insulated and closed at their upper portion by a system using a valve (a ball for example), which is actuated by the animal with his muzzle.

It is thus necessary to empty the watering trough regularly, because the water becomes polluted and if possible to clean it.

To facilitate cleaning, there has been proposed, in the patent EP 0 753 250 in the name of the applicant, to fix the cover of the tank of the watering trough by rapid attachment means; such that one can raise it easily and rapidly without needing tools. But it is necessary to empty it to clean it. For this purpose, there has been disposed adjacent the bottom of the tank an emptying plug, by housing this plug in the sidewall of the tank, so as to avoid having it damaged by the hoofs of the animals.

SUMMARY OF THE INVENTION

In spite of these improvements, the emptying and cleaning of the tank still gives rise to problems to which the present invention provides a satisfactory solution.

BRIEF DESCRIPTION OF THE DRAWINGS

To facilitate understanding of the invention, there is shown in the accompanying drawings.

DESCRIPTION OF THE PREFERRED EMBODIMENTS

Figure 1:
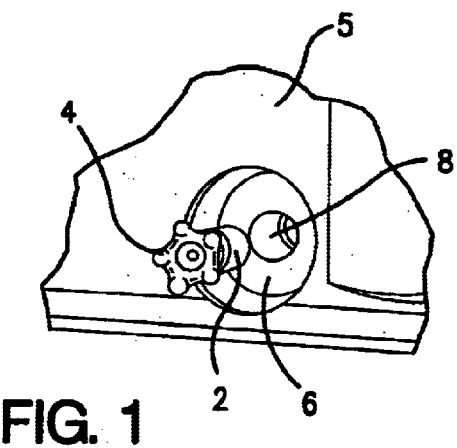
FIG. 1, a perspective view of a present emptying plug.
Figure 2:
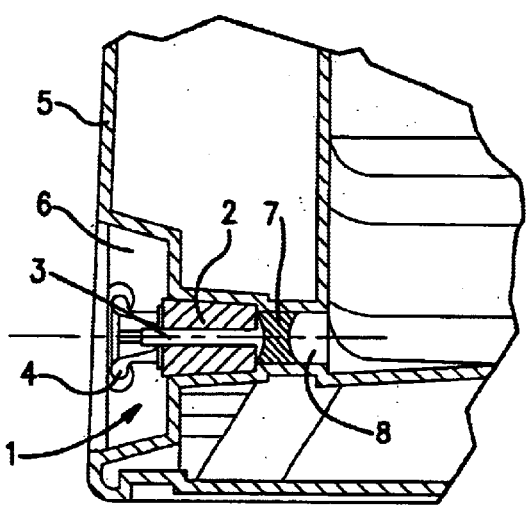
FIG. 2, a cross-section on a larger scale of the plug of FIG. 1.

In FIGS. 1 and 2, it is seen that the plug 1 is a deformable plug which is constituted by a slightly conical member 2 of a deformable material (rubber, plastic or the like), this conical member being traversed by a rod 3, screw-threaded at its end, on which will be screwed a handle 4. The sidewall 5 of the tank comprises a recess 6 in which the handle 4 is received.

This device has the drawbacks described hereafter:

a) It is necessary to leave between the handle 4 and the walls of the recess 6 a sufficient space, about 30 mm, that the user can grasp the handle; but it happens that certain animals succeed in wedging their hoof in this space and pulling the plug 1.

b) The resistance to freezing is not satisfactory. The metallic rod 3 constitutes a thermal conductor and after about 36 hours at −15°, there forms an ice plug 7 in contact with the end of said rod 3, which closes the emptying opening 8. To empty, it is thus necessary to break this ice plug with a tool.

c) Manipulation of the plug is long, because it is necessary to allow about 30 seconds for the unscrewing operation; then 1 to 2 minutes for emptying and about 30 seconds for replacing the plug.

d) Also vegetable debris will be introduced into the watering trough and close the opening 8.

Figure 3:
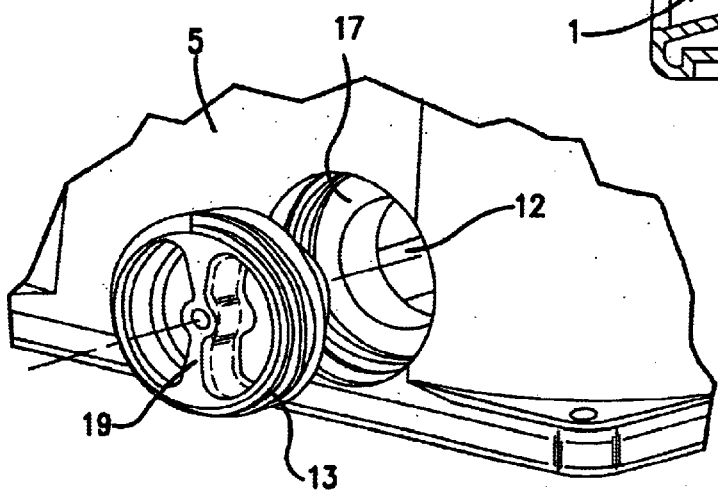
FIG. 3, a perspective view of an embodiment of a plug according to the invention.
Figure 4:
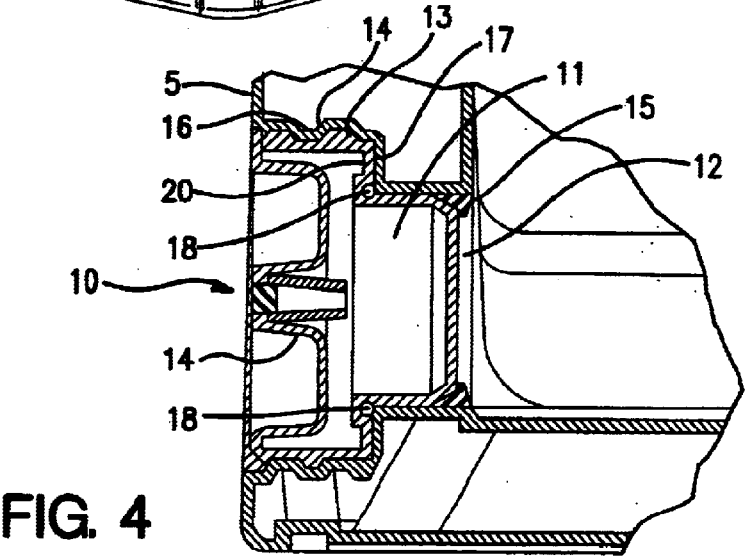
FIG. 4, a cross-sectional view on a larger scale of the plug of FIG. 3.

In FIGS. 3 and 4, it is seen that the plug 10 is of a single piece and comprises a smooth cylindrical portion 11 which closes the opening 12 of the tank, and a screw-threaded cylindrical portion 13 which engages in the screw-thread 14 disposed in the walls of a hollow recess 16, provided in the wall 5 of the tank. The height of the portion 13 is equal to the depth of the recess 16.

According to one characteristic of the invention, the opening 12 (and the plug 11) have a large diameter, between about 90 and 120 mm.

This large diameter permits on the one hand almost instantaneous emptying (several seconds instead of several minutes) and on the other permits introducing into the opening 12 a hand and forearm of the user and hence to clean the bottom of the tank without having to dismount the cover. The rapid emptying is also advantageous in the sense that impurities are entrained more easily by the current flowing out of the tank.

The large diameter of the opening 12 has for its object that this latter cannot as a practical matter be clogged by vegetable debris or other dirt.

This large diameter is also advantageous in the case of deep and prolonged cold.

Thus, instead of forming an ice plug such as the ice plug 7 on the plug, there will be formed an ice ring 15, which breaks very easily when the plug 10 is manipulated.

Preferably, and as shown in FIGS. 3 and 4, the two portions 12 and 13 of the plug have different diameters, the screw-threaded portion 13 having a greater diameter than that of the portion 11.

In one embodiment, there has been given a diameter of 100 mm for the opening 12, and hence the portion 11 of the plug 10, and a diameter of 162 mm for the portion 13.

This permits having a shoulder 20 between the portions 11 and 13, which shoulder rests against a corresponding shoulder 17 between the opening 12 and the screw-threaded recess 16.

This shoulder 20 carries an O-ring 18.

Within the portion 13 of the plug 10 is disposed a handle 19, which is formed from a hollow within the mass of the plug.

There are thus obtained the following advantages:

it is impossible for an animal to wedge a hoof or a portion of a hoof.

The screw-threading 13 having a large diameter, the closing of the plug requires but one turn; as a result, the opening and closing manipulations are very rapid.

The emptying is almost instantaneous, which carries out most of the polluting bodies.

Clogging of the emptying opening is avoided.

the width of the opening 12 permits introducing into the tank a hand carrying a cleaning utensil.

In case of deep and prolonged freezing, the dimensions of the handle 19 permit easily breaking the small ice ring 15.

The O-ring 18 ensures sealing and prevents debris from reaching the screw-threading of the portion 13 of the plug 10.

All these advantages together impart a considerable improvement to the watering trough.

Preferably, the portion 11 of the plug 10 is hollow such that there can be injected an insulating material therein, for example polyurethane foam, thereby rendering the plug isothermal.

It is to be noted that between the external wall 5 of the tank and its internal wall is located a space which is filled with insulation, for example polyurethane foam. By filling the portion 11 of the plug with an insulating material, the continuity of insulation of the wall of the tank is maintained.

Also preferably, the handle and the screw-thread pitch are such that the handle 19 will always be in the vertical position at the end of screwing, so as not to offer a step for the hoof of an animal.

What is claimed is:

1. Watering trough for animals provided at the base of its tank with a sidewall emptying opening, characterized by the fact that said emptying opening (12) is of large diameter and is closed by a monobloc plug (10) in two parts, a first part (11) which closes the emptying opening (12) and a second screw-threaded part (13), which engages in a screw-thread (14) disposed in the wall of a recess (16) hollowed out in the wall (5) of the tank; the height of said second screw-threaded part (13) being equal to the depth of said recess (16).

2. Watering trough according to claim 1, in which the second screw-threaded part (13) of the plug (10) has a diameter greater than the first part (11) which penetrates the opening (12) of the tank so as to comprise a shoulder provided with an O-ring (18).

3. Watering trough according to claim 1, in which the second screw-threaded part (13) of the plug (10) comprises a handle (19), which is made in a hollow within the mass of the plug.

4. Watering trough according to claim 3, in which a screw pitch and the handle are so made that, at the end of screwing, said handle (19) will be in a vertical position.

5. Watering trough according to claim 1, in which the first part (11) of the plug has a diameter of 100 mm, the second screw-threaded part (13) having a diameter of 162 mm.

6. Watering trough according to claim 1, in which the first part (11) of the plug is hollow and filled with an insulating material.

7. Watering trough of claim 1, wherein said empty opening is between 90 and 120 mm.

8. Watering trough for animals provided at the base of its tank with an emptying opening through a sidewall (5) of the tank, wherein said emptying opening (12) is of large diameter and is closed by a monobloc plug (10), said monobloc plug (10) comprising two parts, a first part (11) which closes the emptying opening (12) and a second screw-threaded part (13) which engages in a screw-thread (14) disposed in the wall of a recess (16) hollowed out in the sidewall (5) of the tank, the height of said second part (13) being equal (16) to the depth of said recess (16).

9. Watering trough of claim 8, wherein said empty opening is between 90 and 120 mm.

10. Watering trough according to claim 8, in which the second screw-threaded part (13) of the plug (10) has a diameter greater than the first part (11) which penetrates the opening (12) of the tank so as to comprise a shoulder provided with an O-ring (18).

11. Watering trough according to claim 8, in which the second screw-threaded part (13) of the plug (10) comprises a handle (19), which is made in a hollow within the mass of the plug.

12. Watering trough according to claim 11, in which a screw pitch and the handle are so made that, at the end of screwing, said handle (19) will be in a vertical position.

13. Watering trough according to claim 8, in which the first part (11) of the plug has a diameter of 100 mm, the second screw-threaded part (13) having a diameter of 162 mm.

14. Watering trough according to claim 8, in which the first part (11) of the plug is hollow and filled with an insulating material.

15. Watering trough for animals comprising:
a tank with a sidewall;
an emptying opening in a base of the sidewall;
a screw-threaded recess disposed in the sidewall and in fluid communication with the opening; and
a monobloc plug closing the opening, the plug comprising a first part and a second part, the first part closing the opening, the second part screw engaged with the recess,
a height of the second part being equal to a depth of the recess.

16. Watering trough of claim 15, wherein a diameter of the second part is greater than a diameter of the first part.

17. Watering trough of claim 16, further comprising a sealing ring at an intersection of the first and second parts.

18. Watering trough of claim 15, wherein the first part includes a hollow.

19. Watering trough of claim 18, wherein the first part is filled with an insulating material.

20. Watering trough of claim 18, wherein the plug further comprises a handle formed within the hollow.

* * * * *